No. 837,693.

PATENTED DEC. 4, 1906.

C. LANZ.
GROUND CONNECTION FOR TELEPHONE WIRES.
APPLICATION FILED OCT. 10, 1905.

WITNESSES.
J. R. Keller
Robert C. Totten

INVENTOR.
Charles Lanz
By Kay Totten & Winter
attorneys

UNITED STATES PATENT OFFICE.

CHARLES LANZ, OF KNOXVILLE, PENNSYLVANIA.

GROUND CONNECTION FOR TELEPHONE-WIRES.

No. 837,693.

Specification of Letters Patent.

Patented Dec. 4, 1906.

Application filed October 10, 1905. Serial No. 282,159.

*To all whom it may concern:*

Be it known that I, CHARLES LANZ, a resident of Knoxville, in the county of Allegheny and State of Pennsylvania, have invented a new and useful Improvement in Ground Connections for Telephone-Wires; and I do hereby declare the following to be a full, clear, and exact description thereof.

My invention relates to a ground connection for telephone and other electric wires and the method of making the same.

The object is to facilitate and cheapen the manufacture of this class of articles.

In all telephone and telegraph systems it is necessary to provide a ground connection at the various instruments and at other places on the line. This is usually effected by providing a rod which is driven into the ground and having the ground-wire connected thereto. These rods preferably should be galvanized, so as to prevent them from rusting and insuring a better electrical conduction between the rod and the earth. Heretofore these ground connections have been made by taking a galvanized iron or steel rod, winding the ground-wire around the same, and then soldering the two together. This has necessitated hand-work, which has been quite slow and expensive.

My invention is designed to provide the same articles and at much less cost.

To this end the invention consists, generally stated, in winding or coiling the wire around the rod and preferably also applying a cup-shaped disk or washer at the coil and then dipping the whole into spelter and withdrawing the same, preferably endwise, or at least holding the rod in vertical position after withdrawal. As a consequence the rod and wire coil are thoroughly galvanized to protect the same from rusting, and, furthermore, the spelter unites the coiled wire to the rod, thus doing away with soldering and forming a good electrical connection, while by holding the rod vertically after withdrawal from the bath the spelter runs down into the cup and forms a very thick coating around the coiled portion of the wire, thus forming a connection which cannot accidentally be torn loose.

Figure 1:
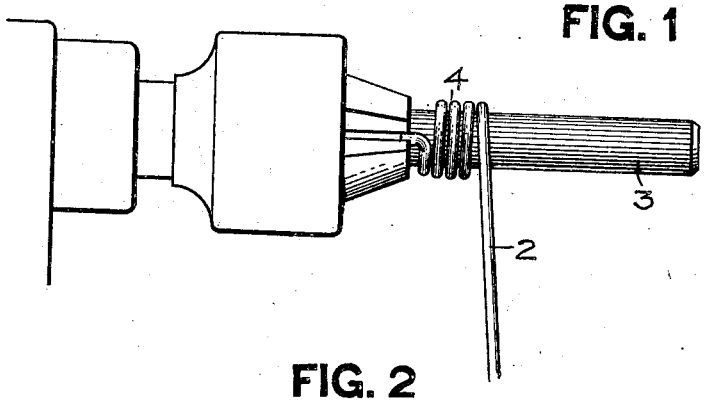
Figure 2:
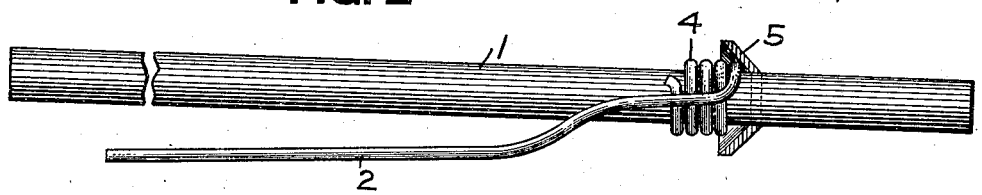
Figure 3:
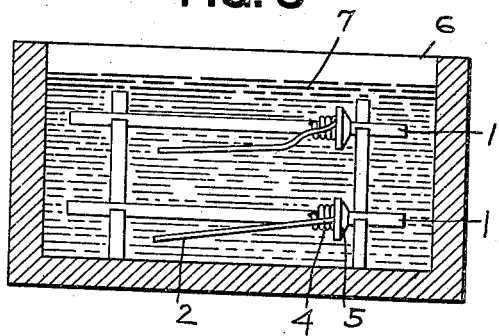
Figure 4:
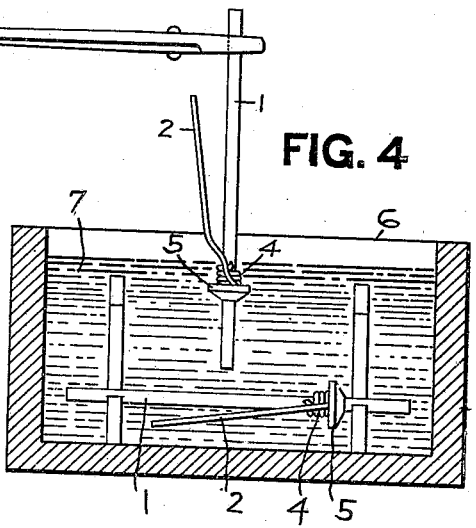
Figure 5:

In the accompanying drawings, Figure 1 is a diagrammatic view illustrating the coiling of the wire. Fig. 2 is a side view showing the rod with the coiled wire and a cup-disk thereon. Fig. 3 illustrates the galvanizing of the same. Fig. 4 illustrates the manner of withdrawing the article from the bath, and Fig. 5 is a side view of the finished article.

The ground-rod is shown at 1, and this may be of any suitable size or shape. I take a rod of suitable length and either wrap around the same one end of the wire 2, coiling the same around the rod a sufficient number of times to make a fairly firm connection, or else coil the wire on a mandrel 3, as shown in Fig. 1. The coil of the wire is shown at 4. This rod and connected wire can then be immersed in the galvanizing-bath; but I prefer to add to the same a cup-shaped disk or washer 5, which is pushed up on the rod close to the coil 4 and the whole then galvanized. The galvanizing may be effected in any well-understood way, such as by immersing the same in a tank 6, containing a bath 7 of spelter.

After remaining in the bath a suitable length of time the article is withdrawn, preferably endwise, as shown in Fig. 4. The immersion in the bath causes the rod and coil 4 to be covered with spelter, and the spelter also gets in between the coils 4 and the rod and forms practically a soldered joint, so as to give a good electrical connection. Even without the disk 5 the electrical connection would be good and the coil 4 would be quite firmly soldered to the rod 1; but when the cup 5 is used the hot spelter runs down into said cup when the rod is held in vertical position, as shown in Fig. 4, and gathers in the cup and hardens as it flows down, so as to completely hide the disk and the coil 4. This makes such a firm connection of the coil with the rod that the coil cannot be loosened on the rod without very severe force.

The coil 4 may be formed by winding directly on the rod 1; but in the actual process of manufacture the coil is formed on a machine or mandrel, as shown, and afterward slipped onto the rod. The coil is formed of such size that it grips the rod with considerable firmness, and the cup-shaped disk also is so made that it grips the rod with sufficient firmness to stay in place.

The galvanizing process described practically costs no more than that which must necessarily be applied to the rod in any event. The only thing added in my process is the disk or washer 5, and this is a matter of very small expense. All hand-soldering is done away with, and as a consequence the article can be made very cheaply. At the same time a good electric joint is formed, one which cannot easily be broken loose, and both the rod and the connecting-wire are thoroughly covered with spelter, so that they cannot corrode.

What I claim is—

1. A ground connection comprising a rod, a wire coiled around said rod, a disk on the rod at the coil, and spelter covering said rod and connecting said disk and coil to the rod.

2. A ground connection comprising a rod, a wire coiled around the rod, a cup-shaped disk on the rod at the coil and overhanging the latter, and spelter covering the rod, coil and disk and securing the coil and disk to the rod.

3. The method of forming ground connections, which consists in providing a rod with a wire coiled around the same, immersing the rod and coil in a galvanizing-bath, and then withdrawing the same and holding in a vertical position.

4. The method of forming ground connections, which consists in providing a wire with a coiled end surrounding a rod and a disk on the rod adjacent to said coil, immersing the whole in a galvanizing-bath, and then withdrawing the same and holding in a vertical position.

5. The method of forming ground connections, which consists in providing a rod with a wire coiled around the same, placing a disk on the rod adjacent to the coil, immersing the same in a galvanizing-bath, withdrawing the same vertically and holding in a vertical position.

In testimony whereof I, the said CHARLES LANZ, have hereunto set my hand.

CHARLES LANZ.

Witnesses:
ROBERT C. TOTTEN,
J. R. KELLER.